(12) United States Patent
Schmeelk

(10) Patent No.: US 10,333,769 B2
(45) Date of Patent: Jun. 25, 2019

(54) DEPLOYABLE LINEAR BITWISE PROTOCOL TRANSFORMATION

(71) Applicant: LGS INNOVATIONS LLC INC, Herndon, VA (US)

(72) Inventor: Suzanna Schmeelk, Florham Park, NJ (US)

(73) Assignee: LGS Innovations LLC, Herndon, VA (US)

( * ) Notice: Subject to any disclaimer, the term of this patent is extended or adjusted under 35 U.S.C. 154(b) by 131 days.

(21) Appl. No.: 15/274,396

(22) Filed: Sep. 23, 2016

(65) Prior Publication Data

US 2017/0359441 A1   Dec. 14, 2017

Related U.S. Application Data

(60) Provisional application No. 62/347,706, filed on Jun. 9, 2016.

(51) Int. Cl.
| | |
|---|---|
| *H04L 29/08* | (2006.01) |
| *H04L 12/24* | (2006.01) |
| *H04L 12/26* | (2006.01) |
| *H04L 29/06* | (2006.01) |

(52) U.S. Cl.
CPC ............ *H04L 41/046* (2013.01); *H04L 43/18* (2013.01); *H04L 43/50* (2013.01); *H04L 69/22* (2013.01); *H04L 29/08* (2013.01)

(58) Field of Classification Search
None
See application file for complete search history.

(56) References Cited

U.S. PATENT DOCUMENTS

| | | | | |
|---|---|---|---|---|
| 8,064,350 B2* | 11/2011 | Peterman | ................ | H04L 43/18 370/221 |
| 2006/0077895 A1* | 4/2006 | Wright | ............. | H04L 29/12358 370/235 |
| 2008/0020737 A1* | 1/2008 | Neil | .................... | G06F 9/44505 455/414.1 |
| 2008/0279216 A1* | 11/2008 | Sharif-Ahmadi | ....... | H04L 47/10 370/465 |
| 2014/0355580 A1* | 12/2014 | Tinnirello | ............. | H04W 24/02 370/338 |

* cited by examiner

*Primary Examiner* — Viet D Vu
*Assistant Examiner* — James A Edwards
(74) *Attorney, Agent, or Firm* — Baker & Hostetler LLP

(57) ABSTRACT

The present application is directed to a networked apparatus including a non-transitory memory having instructions stored thereon for generating network traffic based upon a linear representation of a predetermined protocol. The apparatus also includes a processor operably coupled to the non-transitory memory and the listening tool. The processor is configured to perform the instructions of spawning a finite state machine based upon the linear representation of the predefined protocol. The processor is also configured to perform the instructions of sending data of the finite state machine to an endpoint to screen the network traffic. The processor is also configured to perform the instructions of receiving the screened network traffic from the endpoint based upon the finite state machine. The application is also directed to a method for testing network traffic.

7 Claims, 12 Drawing Sheets

DEPLOYABLE LINEAR BITWISE PROTOCOL TRANSFORMATION

CROSS-REFERENCE TO RELATED APPLICATIONS

This application claims priority to U.S. Provisional Application No. 62/347,706, filed Jun. 9, 2016, the disclosure of which is incorporated herein by reference in its entirety

BACKGROUND

1. Field

This application is directed to capturing a linear representation of a protocol in a network for testing. More particularly, the application is directed to the field of cyber security where network traffic is analyzed based upon the linear representation of the captured protocol.

2. Related Art

Traditionally, protocol research has spanned three broad areas. These areas include specification, verification and reverse engineering. The first two areas involve formally describing a protocol and then verifying it did not contain deadlock situations or other service interrupting communication flows. The third area of reverse engineering has been an active study item in the field of cyber security.

Protocol reverse engineering is generally understood as the process of extracting an application-level protocol used by an implementation without access to the protocol specification. Researchers then employ these network traces to infer a protocol specification. Generally, protocol reverse engineering involves analyzing one or more of client binary or source code, e.g., client receiving commands, server binary or source code, e.g., system sending commands, and captured network activity, e.g., PCAP. However, these conventional techniques require significant additional equipment and capital contribution.

What is desired in the art is a simple technique for capturing the behavior of a protocol for network emulation.

What is also desired in the art is a system that captures protocol behavior without requiring additional specialized equipment.

What is even further desired in the art is a cost effective system that is efficient to operate.

What is further desired in the art is a secure technique that does not require installation of untrusted third party libraries for capturing protocol behavior.

SUMMARY

The foregoing needs are met, to a great extent, by the application directed to a deployable linear bitwise protocol transformation.

One embodiment of the application is directed a computer-implemented method for generating a linear representation of a protocol on a network. The method includes a step of receiving, via a packet analyzer, a packet capture file or specification from the network. The method also includes a step of selecting the protocol from the packet capture file or specification based upon predetermined criteria. The method also includes a step of sending the selected protocol to a protocol generator that parses information of the protocol for characterization. Further, the method includes a step of outputting the linear representation of the protocol based upon the parsed information.

Another embodiment of the application is directed to a networked apparatus including a non-transitory memory having instructions stored thereon for generating network traffic based upon a linear representation of a predetermined protocol. The apparatus also includes a processor operably coupled to the non-transitory memory and the listening tool. The processor is configured to perform the instructions of spawning a finite state machine based upon the linear representation of the predefined protocol. The processor is also configured to perform the instructions of sending data of the finite state machine to an endpoint to screen the network traffic. The processor is also configured to perform the instructions of receiving the screened network traffic from the endpoint based upon the finite state machine.

Yet another embodiment of the application is directed to a computer-implemented method for testing network traffic. The method includes a step of providing a client and a server. The method also includes a step of spawning a finite machine based upon a linear representation of a predefined protocol of the network traffic. The method includes a step of sending screened network traffic based upon the linear representation to the client and the server. The method further includes a step of authenticating the sent traffic at the client or server.

There has thus been outlined, rather broadly, certain embodiments in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the invention and intended only to be illustrative.

FIG. 3 illustrates an example of a packet header.

FIG. 5 illustrates an example of an ISO website listing service names to ports.

FIG. 6 illustrates an example of a TCP packet heater and body.

FIG. 9 illustrates an example of authenticated message traffic according to an embodiment of the application.

DETAILED DESCRIPTION

Figure 1A:
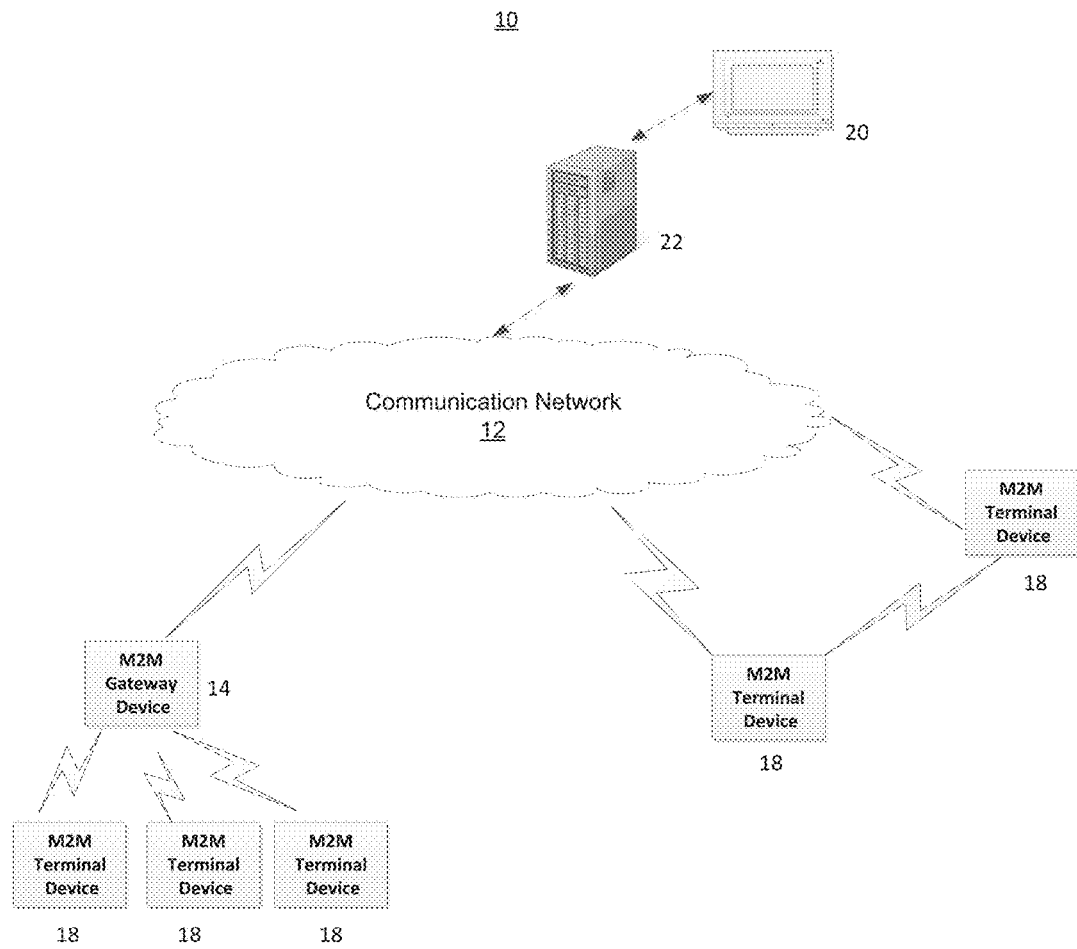
FIG. 1A illustrates a machine-to-machine (M2M) or internet of things (IOT) communication system according to an embodiment of the application.

In this respect, before explaining at least one embodiment of the invention in detail, it is to be understood that the invention is not limited in its application to the details of construction and to the arrangements of the components set forth in the following description or illustrated in the drawings. The invention is capable of embodiments or embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not by other embodiments.

According to an aspect, the application is directed to understanding network protocol interactions without requiring expensive equipment. This is key to the future of sustainable network testing, emulation, development and assurance. Doing so requires network security engineers to deploy, study, and test different kinds of networks. These networks range from niche Internet of Things (IoT) environments to enterprise and carrier environments. The applications and techniques described herein are envisaged to operate with dynamic protocol implementations.

According to this application, protocols in full or in part are described using the novel linear bitwise protocol transformation technique. The transformation technique transforms bits in a packet and one or many protocol finite state machines for the protocol. Once the protocol, or part thereof of the protocol, is transformed, it can then be used for a wide variety of activity (e.g., dynamically relayed across the network in real time, loaded locally on a machine or stored locally in a transformed protocol library, among other usages).

According to another aspect of this application, the relayed, transformed protocol may be used to capture network protocol anomalies. The network protocol anomalies may be analyzed, machine learned and/or referenced on other network nodes to discover malware, intrusion detection, etc. The relayed, transformed protocol may also be used to send a network protocol or part of a protocol, to any machine which uses protocols for communication. The protocol transformation can optionally be configured to reference an application. This methodology abstracts the loading of a protocol onto a machine to be from the outside into the machine, dynamically altering the machine state without requiring the machine to reboot.

In even another aspect of the application, a protocol may be mathematically transformed into a linear representation. The representation is subsequently loaded in real-time onto a fitted machine. Next, the machine tests the protocol. Further, the protocol may be deleted from the machine after completion of the test. Accordingly excessive process spawning or machine rebooting is minimized for the timely testing of machines with limited resources.

In another aspect, the application is directed to techniques that cleanly understand, define, load, use and delete protocols for network testing in real-time. That is, the technique captures the behavior of protocols in an efficient manner. The captured behavior is then employed by the framework described herein to dynamically emulate a network.

In an embodiment, the technique can be used for testing protocols in all network environments. The framework involves both forward- and reverse-transformations of protocols.

In another embodiment, the technique can be used to analyze protocols in the cyber security domain for fraud, service faults and heuristics. The reverse transformation of protocols from network traces considerably expands the research that can be done in this domain. For instance, fuzzing can be implemented. Also, protocol behavioral analysis may occur leading to protocol verification and non-denial of service testing. Here, verification occurs from the inside-out distinct rather than from the outside-in. Finally, other statistics can be examined that are used by intrusion detection systems (IDS), firewalls and other fraud detection machines.

General Architecture

FIG. 1A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 1A, the M2M/IoT/WoT communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a satellite network, a home network, or an enterprise network for example.

As shown in FIG. 1A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14, such as a Service Capability Server (SCS) with a proxy, and terminal devices 18, such as UE devices. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular as well as fixed network M2M devices, e.g., PLC, to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN, e.g., Zigbee, 6LoWPAN, Bluetooth, direct radio link, and wireline for example.

Figure 1B:
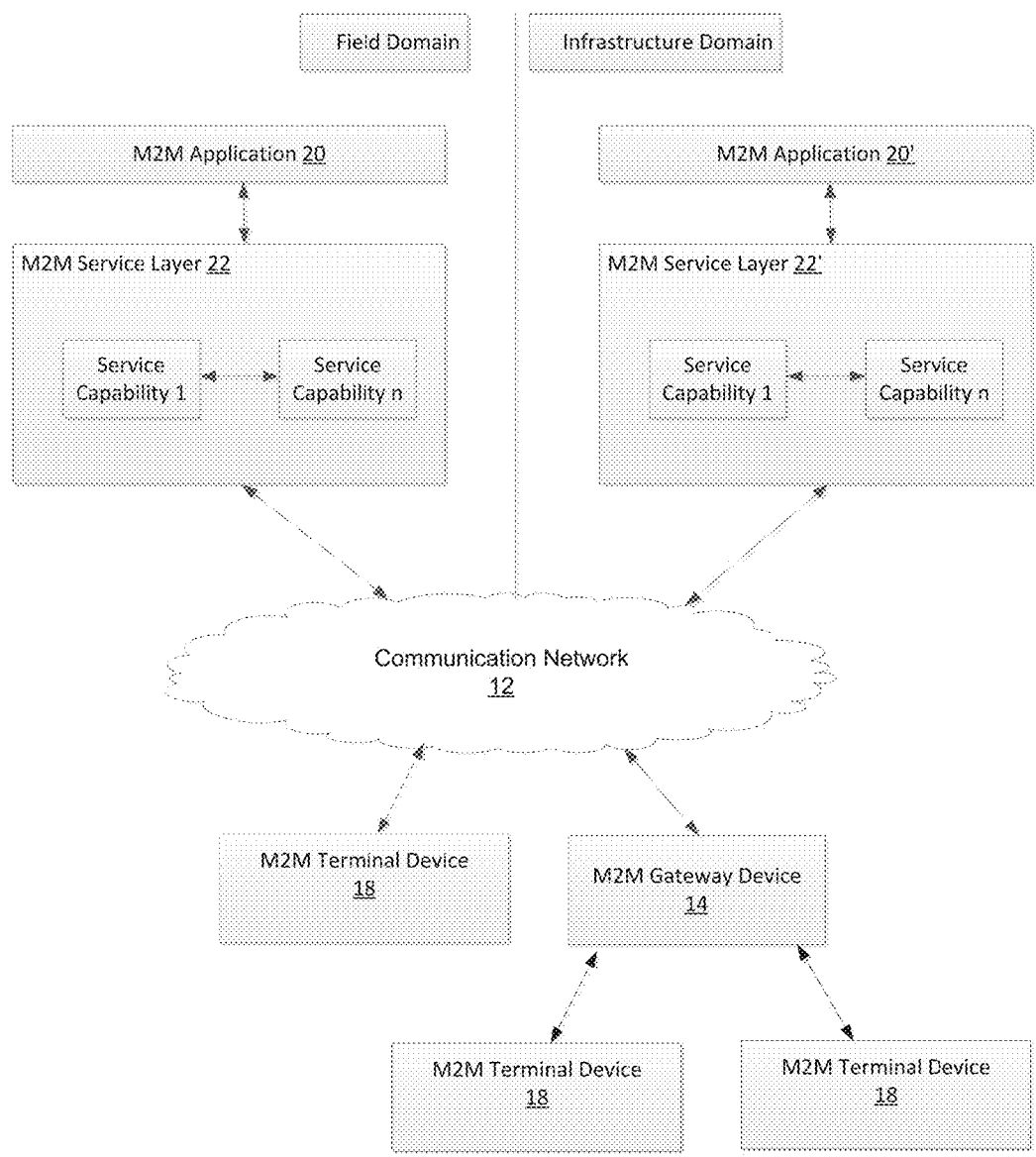
FIG. 1B illustrates a service M2M service platform according to an embodiment of the application.

Referring to FIG. 1B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, such as for example transit CSEs, M2M terminal devices 18, such as host CSEs and Originators, as well as communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways. For example, the M2M service layer 22 could be implemented in a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines, e.g., cloud/compute/storage farms, etc., or the like.

Referring also to FIG. 1B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location Tracking/geo-fencing, device/service discovery, and legacy systems integration, and provides these functions as services to the M2M applications 20 and 20'. Moreover, the M2M service layer may also be configured to interface with other devices such as UEs, SCSs and MMES as discussed in this application and illustrated in the figures.

Figure 1C:
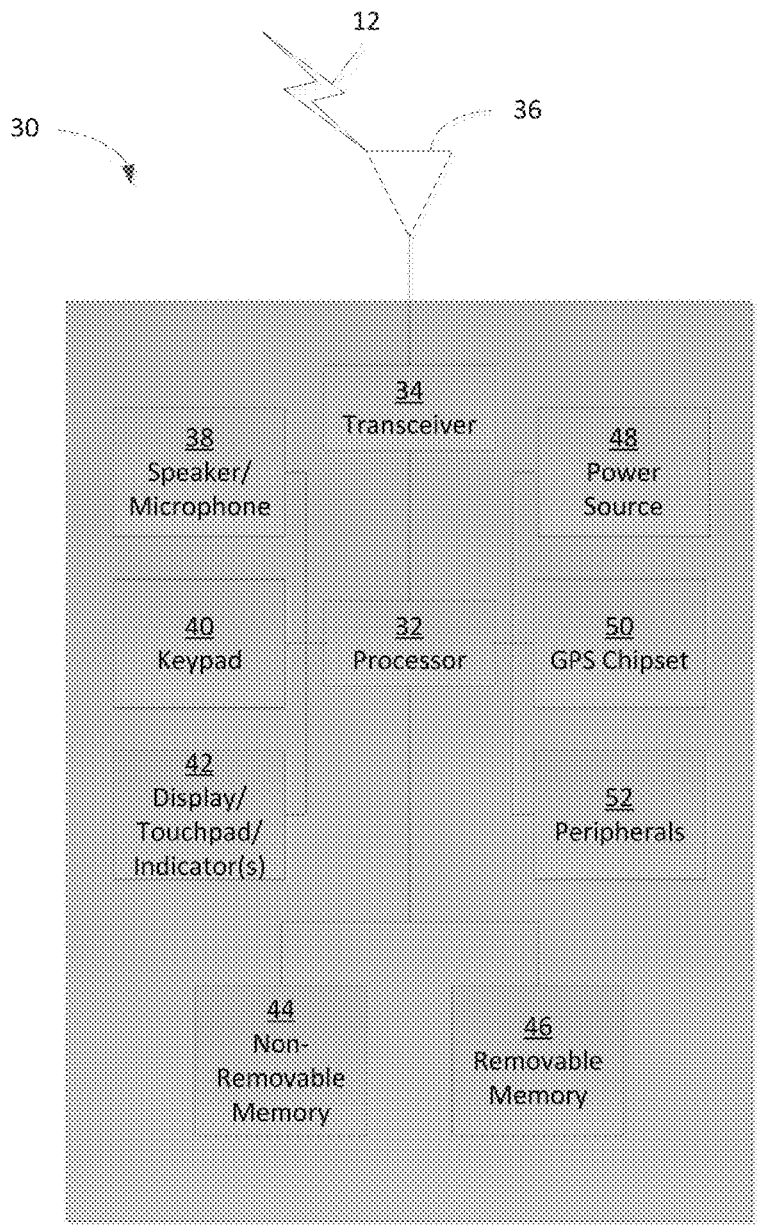
FIG. 1C illustrates a system diagram of an exemplary M2M device according to an embodiment of the application.

The service layer is a software middleware layer that supports value-added service capabilities through a set of Application Programming Interfaces (APIs) and underlying networking interfaces. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The one M2M service layer supports a set of Common Service Functions (CSFs), e.g., service capabilities. An instantiation of a set of one or more particular types of CSFs is referred to as a Common Services Entity (CSE), such as a SCS which may be hosted on different types of network nodes, e.g., infrastructure node, middle node, application-specific node FIG. 1C is a system diagram of an example M2M device 30, such as a M2M terminal device 18 or an M2M gateway device 14 for example. As shown in FIG. 1C, the M2M device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. It will be appreciated that the M2M device 40 may include any sub-combination of the foregoing elements while remaining consistent with an embodiment. The M2M device 30 may also be employed with other devices, including for example originators and hosting/transit CSEs as described in this application and as illustrated in the figures.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 5C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 1C as a single element, the M2M device 30 may include any number of transmit/receive elements 36. More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1D:
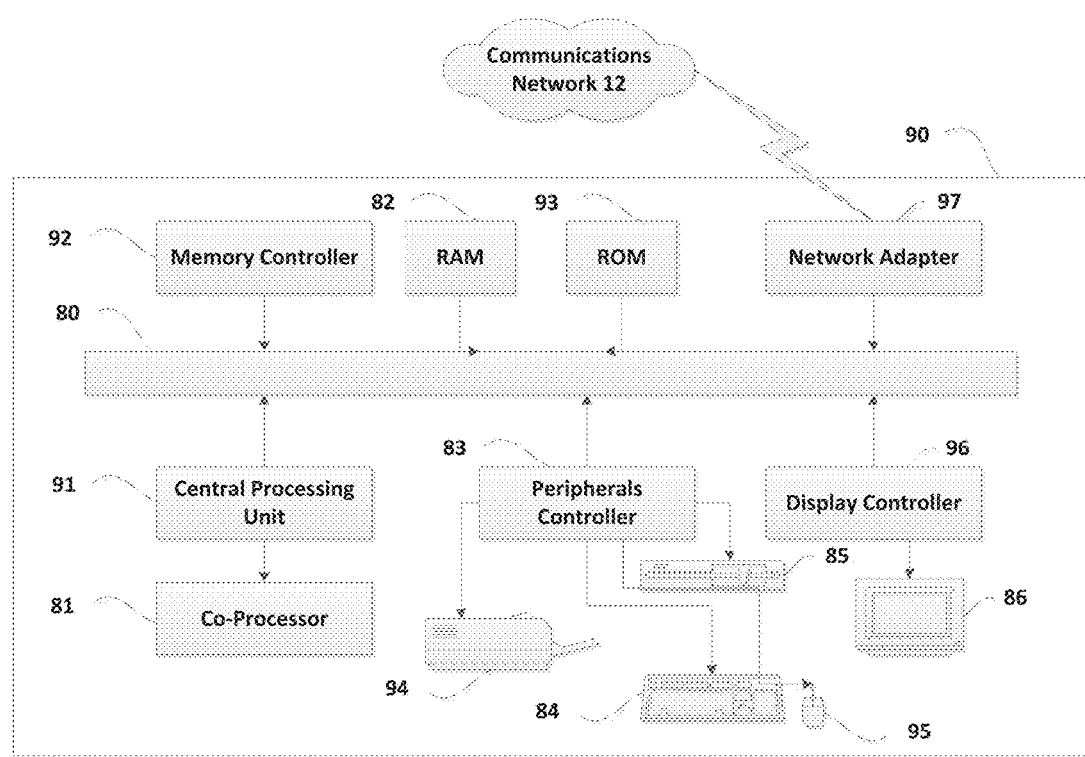
FIG. 1D illustrates a block diagram of an exemplary computing system according to an embodiment of the application.

FIG. 1D is a block diagram of an exemplary computing system 90 on which, for example, the M2M service platform 22 of FIG. 1A and FIG. 1B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. This may include, for example, discovery results for multi-hop discovery, conditional discovery and hosting CSE redirect. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. Further, computing system 90 may contain network adaptor 97 that may be used to connect computing system 90 to an external communications network, such as network 12 of FIG. 1A and FIG. 1B.

Transforming Protocol Elements into Linear Bitwise Representations

Protocols come in three strands: bits, bytes and text. Bits and byte protocols predominately divide-up packet formation based on bits and bytes. Meanwhile, a text based protocol, e.g., HTTP, divides-up packet formation based on text and character identification. The linear bitwise technique of the present application represents all three categories.

In transit in the core, packet bits of a protocol are nothing more than an indication of an on/off value. Each end of the communication needs to reassemble the on/off values and interpret the received signals. The beauty of this kind of a core-based structure is referred to as complexity-at-the-edge where machines are for the most part independent and isolated of any other machine. Our linear bitwise protocol implementation capitalizes on the Internet architecture to achieve a very substantial goal.

According to an embodiment of the application, the protocol structure and behavior is expressed in eXtensible Markup Language (XML). XML is a ubiquitous and dynamic structure. The structure is detailed and dynamic enough to express what needs to be expressed for remote deployment. XML is standardized and can be used to express all Internet layer protocols.

```
<protocol id=[x] layer=[x] name=["Protocol Name"] >
- - -
</protocol>
```

The research entailed in this application identified a plurality of elements for dynamic protocol generation. In an embodiment, the plurality of elements was greater than 10. In another embodiment, the plurality of elements was greater than 15. In yet another embodiment, the plurality of elements was less than 20 and greater than 15.

In an exemplary embodiment, seventeen elements are considered ideal for dynamic protocol generation. Some of these protocols are dependent. Others are independent across protocols. For example, integrity checking, authentication checking, state diagrams, counters, time intervals and control structures vary across protocols.

One of the elements is related to direction. Protocols can be uni- or multi-directional. Simple protocols including UDP are ubiquitous and unidirectional. Simple protocols usually offer no guarantees but are usually considered fast. Protocols are grouped into 1 up to n directional levels. In an n directional scenario, broadcasting is a minimal scenario. An example of the code is provided below.

```
<protocol id=[x] layer=[x] name=["Protocol Name"]
    directions=[1....B]>
    ...
</protocol>
```

Figure 2:
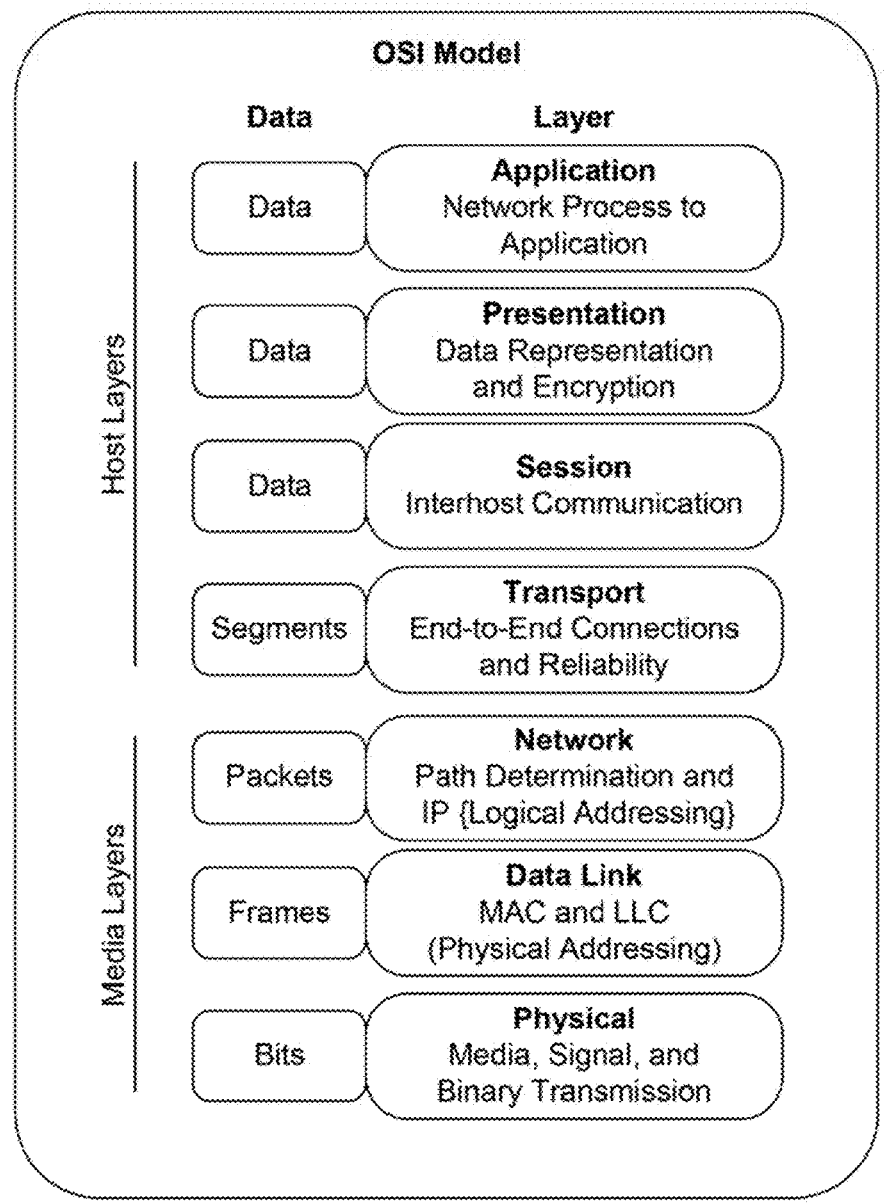
FIG. 2 illustrates an example of an open service interconnect.
Figure 4:
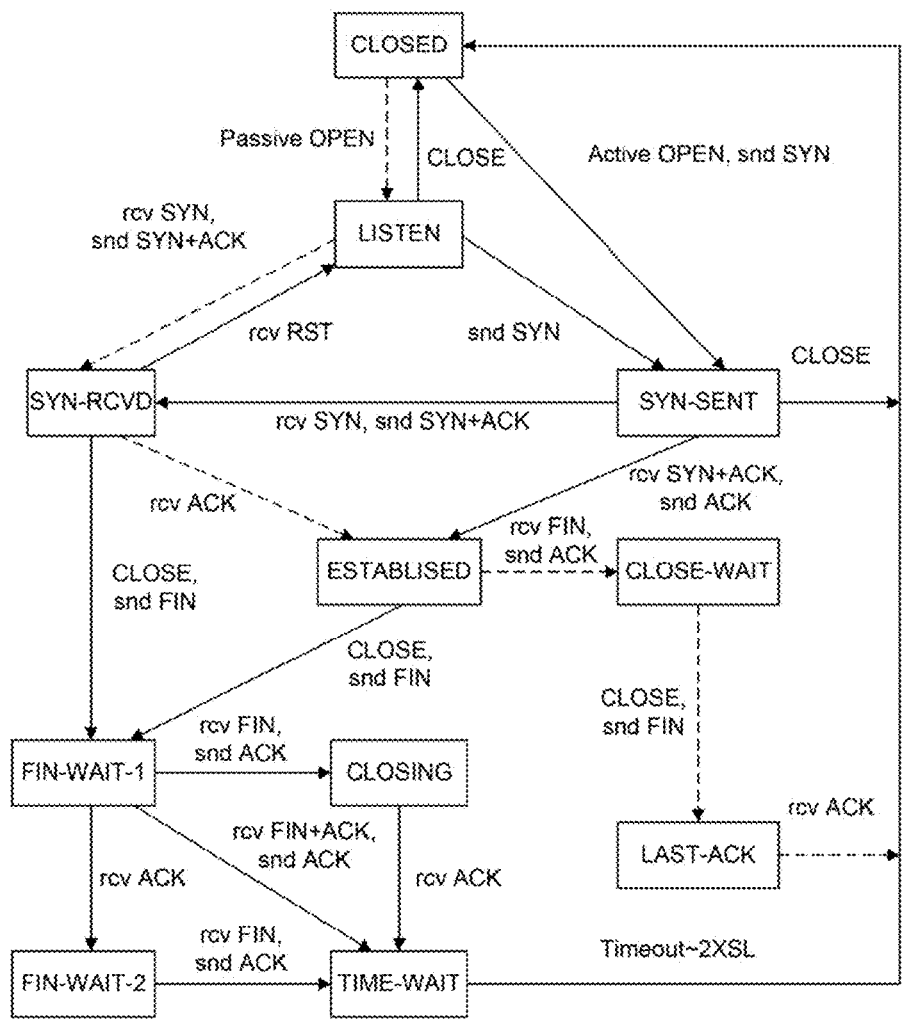
FIG. 4 illustrates an example of a custom TCP finite state machine.

According to an embodiment, the features include protocol stacks. Protocols have been developed to modularize communication. They are, thus, designed to be used in a protocol-stack environment where each layer can depend on a lower layer for certain features. The Open Service Interconnect (OSI) model, used by the public Internet, uses a seven-layer as seen in FIG. 2. In an aspect of this embodiment, higher levels register with lower layers. In a further embodiment, lower layers do not register with higher levels. Exemplary code is provided below.

```
<protocol id=[x] layer=[x] name=["Protocol Name"]
    directions=[1....B]
    layer_below=[x1_id, x2_id, ...] >
    ...
</protocol>
```

In another embodiment, the features of a header format are described. During communication, protocols send packets to convey their messages. Each packet sent by the protocol has a special header to identify who the message is coming from and where the message is going. Traditionally, protocol headers are similar to addressing U.S. mail. Also, headers may indicate specialized information to the corresponding entities through the use of setting flags.

In an embodiment, the TCP header can be shown in a computer program such as for example Wireshark. Due to the nature of header diversity, a header should be specified in a bitwise methodology. The application describes numbers delineated by ':' to simplify parsing. In addition, the technique describes adding totals to all fields to ensure proper configuration. The header bit total will be used by the machine to ensure that the bit specification is indeed mathematically correct

```
<protocol id=[x] layer=[x] name=["Protocol Name"] directions=[1....B]
    layer_below=[x1_id, x2_id, ...] >
    <header header_bit_specification= ["8:1:1:2:3:.....:4:4:6:24:1"]
    header_bit_total=[x]>
    </header>
    ...
</protocol>
```

According to another embodiment, the element of endianness is described. Endianness describes significant bits at either the top or bottom of bytes [please confirm]. The terms endian and endianness describe the convention used to interpret the bytes making up a data word stored in computer memory. In general, memory stores binary data by organizing it into 8-bit units called bytes. When reading or writing a data word, the order of the bytes stored in memory determines the interpretation of the data word. Each byte of data in memory has its own address.

Big endian systems store the most significant byte of a word in the smallest address and the least significant byte is stored in the largest address By contrast, little endian systems store the least significant byte in the smallest address.

Due to the flexibility of various protocols, each bit can flexibly be either left or right aligned. Preferably, it is expected that the bits are completely aligned to the left or completely to the right. It is envisaged to include an alignment representation with each bit in the header bit specification. This can allow for nuances between proprietary, as well as, RFC standards.

The header bit specification is defined using an array-likeness. Any subsequent reference to the header bit specification assumes the same slots in the array. For example, header bit specification of the first element, HeaderBitSpecification[0] would represent the value '8R' and, so forth until, the final array-slot, the HeaderBitSpecification[HeaderBitSpecificationlength( )-1] would represent the valu-0e '1R.'

```
<protocol id=[x] layer=[x] name=["Protocol Name"]
    directions=[1....B]
    layer_below=[x1_id, x2_id, ...] >
```

```
        <header header_bit_specification=
                ["8R:1L:1R:2L:3R:.....:4R:4R:6L:24L:1R"]
                header_bit_total=[x]>
        </header>
        ...
</protocol>
```

According to an embodiment, the elements also include encoding. Specifically, each protocol has a footprint that may be the result of special characters and encoding schemas. This provides a broad way to represent protocols using special characters and specific encoding schema when developing both the packet header and packet data unit. In an exemplary embodiment, the following is envisaged for representing encoding between packet headers. First, we envision an encoding attribute and special character attribute. Second, the encoding is a generalized encoding type and the special characters represent changing certain characters for a specific protocol. The code is preferably described below:

```
<protocol id=[x] layer=[x] name=["Protocol Name"] directions=[1....B]
        layer_below=[x1_id, x2_id, ...] >
    <header
        header_bit_specification=
                ["8R:1L:1R:2L:3R:.....:4R:4R:6L:24L:1R"]
                header_bit_total=[x] encoding="HEX"
                special_characters="0->00:NULL->^M" >
    </header>
    ...
</protocol>
```

Figure 3:
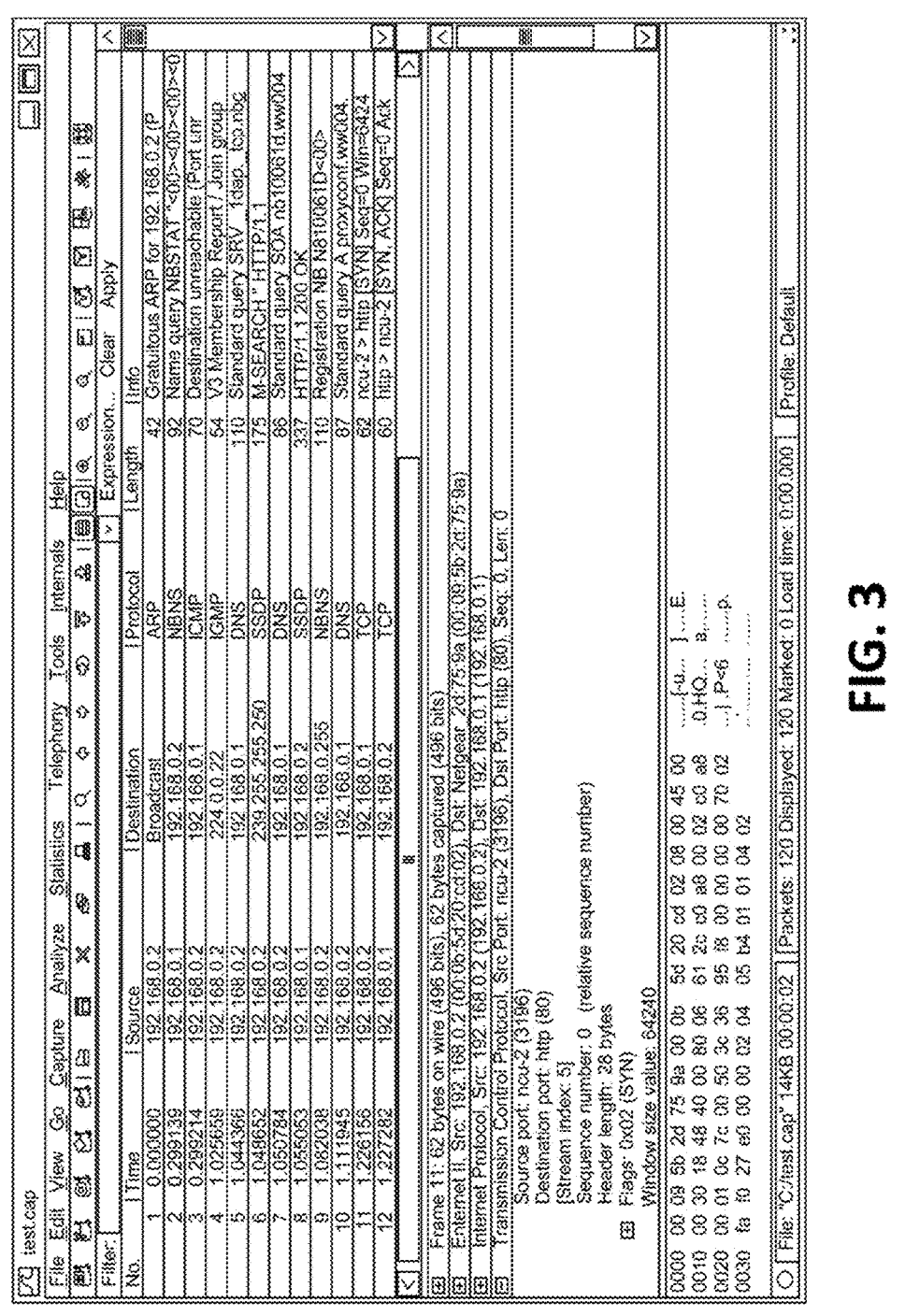

According to another embodiment, Finite State Machines (FSMs) may be employed to represent protocols. Namely, any given time during a communication via a protocol, the protocol is considered to be in a certain state. FIG. 3 shows an example of a FSM of a custom TCP. As illustrated, the FSM can be represented using a directed graph. A small 10 node directed graph takes a relatively small amount of memory. Each edge of a graph can represent events and counters that should occur. We can label this state transition with a unique identifier fid. In addition, each edge can define what happens on the event of failure. In an exemplary embodiment, the exact number of nodes and edges are specified to verify during parsing that the protocol is written as expected.

In another embodiment of FSM, it should be noted that each node and edge pair is defined. This pair is represented by an arrow in FIG. 3. In addition, each edge may be associated with a counter or timer, a failure scenario, or a control structure that needs to be examined. These associations will be examined upon state transition.

```
    ...
    <fsm id=[x] nodes=[x] edges=[x]>
    <fid=[x] node id=[x] edge=[node_id] counter=[counter_id1, ...,
        counter_idn] failure=[failure_id1, ..., failure_idn]
        control_structure[cs_id1, ..., cs_idn]>
    <fid=[x] node id=[x1] edge=[node_id] counter=[counter_id1, ...,
        counter_idn] failure=[failure_id1, ..., failure_idn]
        control_structure[cs_id1, ..., cs_idn]>
    ....
    <fid=[x] node id=[n] edge=[node_id] counter=[counter_id1, ...,
        counter_idn] failure=[failure_id1, ..., failure_idn]
        control_structure[cs_id1, ..., cs_idn]>
    </fsm>
    ...
```

According to yet another embodiment, the protocols may be described by Message Types. For Message Types, each state transition in a FSM changes FSM values. In many cases, the state transition will actually change the message headers and in other FSM transitions only timers and payload will change. A linear representation is needed to model either situation. The linear representation includes collected network traffic packet captures or a specification including data sheets or RFCs. A packet XML statement is envisaged to define each packet. This packet statement will have two attributes to associate them with the correct transition in the FSM, a fsm id and a fid within the FSM.

In an embodiment, multiple FSMS can be employed according to the code below:

```
<protocol id=[x] layer=[x] name=["Protocol Name"]
        directions=[1....B]
        layer_below=[x1_id, x2_id, ...] >
    <packet id=[x] fid=[x] fsmid=[fid]>
        <header header_bit_specification=
                ["8R:1L:1R:2L:3R:.....:4R:4R:6L:24L:1R"]
                header_bit_total=[x]  encoding="HEX"
                special_characters="0->00:NULL->^M"  >
        </header>
</packet>
...
<packet id=[n] fid=[x] fsmid=[fid_n]>
    <header header_bit_specification=
            ["8R:1L:1R:2L:3R:.....:4R:4R:6L:24L:1R"]
            header_bit_total=[x] encoding="HEX"
            special_characters="0->00:NULL->^M"  >
    </header>
</packet>
<fsm id=[x] nodes=[x] edges=[x]>
<fid=[x] node id=[x] edge=[node_id] counter=[counter_id1, ...,
    counter_idn] failure=[failure_id1, ..., failure_idn]
    control_structure[cs_id1, ..., cs_idn]>
    <fid=[x] node id=[x1] edge=[node_id]
            counter=[counter_id1, ..., counter_idn]
            failure=[failure_id1, ..., failure_idn]
            control_structure[cs_id1, ..., cs_idn]>
    ....
    <fid=[x] node id=[n] edge=[node_id]
            counter=[counter_id1, ..., counter_idn]
            failure=[failure_id1,..., failure_idn]
            control_structure[cs_id1, ..., cs_idn]>
</fsm>
```

According to another embodiment, the Body Format is another element used to describe protocols. The body of the packet depends on the state of the FSM. The body is actually used to convey data from one entity to another over the protocol. As protocols are being developing in real-time, the actual application may or may not exist in the apparatus under test.

According to an aspect of this embodiment, four different scenarios are envisaged. First, data payload can be statically defined during protocol specification directly into the protocol XML. Second, data payload can be connected with an XML-RPC system where payload is actually further parsed or retrieved from remote procedure calls. In this case, an interface with an RPC system must take-place. Third, the application may, in fact, exist on the machine. In the third case, an actual association with an application must be made. Fourth, the packet may just be sending empty content or content that needs to be aggregated such as a video. The XML specification for each of the three situations below.

```
<protocol id=[x] layer=[x] name=["Protocol Name"] directions=[1....B]
layer_below=[x1_id, x2_id, ...] >
  <packet id=[x] fid=[x] fsmid=[fid]>
    <header header_bit_specification=
         ["8R:1L:1R:2L:3R:.....:4R:4R:6L:24L:1R"]
    header_bit_total=[x] encoding="HEX"
         special_characters="0->00:NULL->^M"   >
    </header>
    <body body_type = [1]
    body_bit_specification="1R:8R:9R:.....:150L"
    body_bit_total=[x] encoding="HEX"
    special_characters="0->00:NULL->^M"
    body_bit_content=["YMSG":"\r":.....:"STATIC"]>
    </body>
  </packet>
  <packet id=[x] fid=[x] fsmid=[fid] >
    <header header_bit_specification=
         ["8R:1L:1R:2L:3R:.....:4R:4R:6L:24L:1R"]
    header_bit_total=[x] encoding="HEX"
         special_characters="0->00:NULL->^M"   >
    </header>
    <body body_type = [2]
    body_bit_specification="1R:8R:9R:.....:150L"
    body_bit_total=[x] encoding="HEX"
    special_characters="0->00:NULL->^M"
    rpc_library_location=["/home/rpc_library"]
    body_bit_content =["rpc_method_call"]>
    </body>
  </packet>
  ...
  <packet id=[n-1] fid=[x] fsmid=[fid_n]>
    <header header_bit_specification=
         ["8R:1L:1R:2L:3R:.....:4R:4R:6L:24L:1R"]
    header_bit_total=[x]   encoding="HEX"
    special_characters="0->00:NULL->^M"   >
    </header>
    <body body_type = [3]
    body_bit_specification="1R:8R:9R:.....:150L"
    body_bit_total=[x] encoding="HEX"
    special_characters="0->00:NULL->^M"
    application_location=["/sbin/applicaiton"
    applicaiton_parameters   =[param1,....,paramn]>
    </body>
  </packet>
  <packet id=[n] fid=[x] fsmid=[fid_n]>
    <header header_bit_specification=
         ["8R:1L:1R:2L:3R:.....:4R:4R:6L:24L:1R"]
    header_bit_total=[x]   encoding="HEX"
    special_characters="0->00:NULL->^M"   >
    </header>
    <body body_type = [4]
    body_bit_specification="250L"
    body_bit_total=[x]
    encoding="HEX"
    special_characters="0->00:NULL->^M"
    store_location=["/home/temp"] store_parameters
    =[param1,....,paramn]>
    </body>
  </packet>
  ...
</protocol>
```

According to an embodiment, another element is executing protocol payload. Executing protocols depend on the type defined by each packet as described above. If there is static payload, such as in the case of a FIN+ACK, there is no execution of payload. If the application exists on the box, then the application should be executed with any known parameters and the results conveyed back to the remote entity following the FSM. If the application exits on a remote server, an RPC method can be invoked to information retrieval. These cases can be tailored for test environments.

According to an embodiment, another element to describe protocols is queuing. There can be multiple queues for a protocol. First, packets are passed to the protocol. This may be done asynchronously due to network delays. Packets need to be buffered or queued as they arrive. It is expected that there are two buffers by default: a send id=0 and receive id=1. These default buffers will not need to be specified.

Second packets need to align correctly with the FSM and Control Structures. Any additional queues for this alignment will need specifications. A naive approach is to replicate the packet header for each control structure. This application envisages techniques to eliminate packet header duplications.

```
<protocol id=[x] layer=[x] name=["Protocol Name"]
     directions=[1....B]
  layer_below=[x1_id, x2_id, ...] >
  <queue id=[x] default_queue_id=["0 or 1"]
     cs_ids=[1,...,n]>
  </queue>
  ...
  <queue id=[xn] default_queue_id=["0 or 1"]
     cs_ids=[1,...,n]>
  </queue>
  ...
</protocol>
```

In another embodiment, an element to describe protocols is to order messages. Ordering of messages occurs based on the FSM and the control structures.

In yet another embodiment, control structures can be employed to describe protocols. Control Structure may take on many forms. For example, there may be additional control structures, but they can be linearly represented in a similar format. In general, control structures ensure packets are connected correctly and that they do not over flow the network and remote entity. Additionally, control structures can be triggered on the event of worst-case scenarios. An exemplary code can be provided below.

```
<protocol id=[x] layer=[x] name=["Protocol Name"]
     directions=[1....B]
  layer_below=[x1_id, x2_id, ...] >
  <control_structures id=[x] fsm=[x] fid=[x] >
     <cs_action id=[x] start=["0"] action=["+=param1"]
         param1=["header_bit_specification[10]"]
         end_fsm=[x] end_fid=[x]
     </cs_action>
     ...
     <cs_action id=[n]
         start=["0"]
         action=["+=param1"]
         param1=["header_bit_specification[10]"]
         end_fsm=[x] end_fid=[x]
     </cs_action>
  </control_structure>
  ...
  <control_structures id=[n] fsm=[x] fid=[x] >
     <cs_action id=[x]
         start=["0"]
         action=["+=param1"]
         param1=["header_bit_specification[10]"]
         end_fsm=[x] end_fid=[x]
     </cs_action>
     ...
     <cs_action id=[n] start=["0"] action=["+=param1"]
         param1=["header_bit_specification[10]"]
         end_fsm=[x] end_fid=[x]
     </cs_action>
  </control_structure>
  ...
</protocol>
```

In an embodiment, sequencing ensures packets are queued in an ascending order. When the number gets too big it returns to 0. Sequencing can be defined as a control structure with algorithms. All arriving and departing packets are checked with the FSM and control sequences, if any, upon arrival and departure.

In an embodiment, reliable transmissions ensure packets are retransmitted when a timer expires. Reliable transmissions can be defined as a control structure with algorithms. All arriving and departing packets are checked with the FSM and control sequences, if any, upon arrival and departure.

In another embodiment, link control ensures that packets are sent after some predetermined time. Link control can be defined as control structure with algorithms. All arriving and departing packets are checked with the FSM and control sequences, if any, upon arrival and departure.

In even another embodiment, flow control ensures that packets are not overwhelming the receiver. Flow control can be defined as control structure with algorithms. All arriving and departing packets are checked with the FSM and control sequences, if any, upon arrival and departure.

In yet even another embodiment, congestion control ensures that packets do not overwhelm the network. Congestion control can be defined as a control structure with algorithms. All arriving and departing packets are checked with the FSM and control sequences, if any, upon arrival and departure.

According to even another embodiment, failure scenarios ensure actions occur when worst-case situations transpire. Failure scenarios can be defined with a control structure with algorithms. All arriving and departing packets are checked with the FSM and control sequences, if any, upon arrival and departure.

According to another embodiment, counters may be used to describe protocols. In particular, FSM(s) and related control structures contain many counters. It is envisaged to define all counters [please confirm/revise as necessary] in XML using an action attribute defining a parsable stack-based mathematical expression. An exemplary embodiment of the code is provided below.

```
<protocol id=[x] layer=[x] name=["Protocol Name"]
directions=[1....B]
layer_below=[x1_id, x2_id, ...] >
<counter id=[x] fsm=[x] fid=[x]
start=["0"]
action="param1+param1"]
param1=["header_bit_specification[1]"]
</counter>
...
<counter id=[x] fsm=[x] fid=[x]
start=["header_bit_specification[10]"]
action=["++"]
</counter>
...
</protocol>
```

Another embodiment describes time intervals as an element to describe protocols. A FSM and related control structures contains many timers. Timers are used to trigger events. Timers are defined with a start time, end time and action. It is envisaged that a FSM edge exists for expired timers. This which will become the action if the timer completes. [please revise/add] If the FSM changes before the timer expires, the timer is ignored. Provided below is exemplar code for timers.

```
<protocol id=[x] layer=[x] name=["Protocol Name"]
directions=[1....B]
layer_below=[x1_id, x2_id, ...] >
```

-continued

```
<timer id=[x] fsm=[x] fid=[x]
start=["arrival"]
end=["30s"]
action=["fid"]
param1=["header_bit_specification[1]"]
</timer>
...
<timer id=[x] fsm=[x] fid=[x]
start=["departure"]
end=["30s"]
action=["fid"]
</timer>
...
</protocol>
```

According to another embodiment, message integrity is another element to describe protocols. Message integrity is used throughout protocol analysis and calculations. In packets to be sent, the integrity and checksums should be calculated using various standardized algorithms. The algorithms can be defined by the testing application. The protocol can then reference these integrity algorithms. There are two cases. First, the integrity field needs to be created for sending. Second, the integrity field needs to be verified when received. An exemplary embodiment of code is described below:

```
...
<packet id=[1] fid=[x] fsmid=[fid_n]>
    <header header_bit_specification=
        ["8R:1L:1R:2L:3R:.....:4R:4R:6L:24L:1R"]
        header_bit_total=[x] encoding="HEX"
        special_characters="0->00:NULL->^M"
        directional_queue=["0"]
        integrity=[integrity_id]     bit_slot="5"
            bit_range="">
    </header>
        <body body_type = [4]
            body_bit_specification="250L"
            body_bit_total=[x] encoding="HEX"
            special_characters="0->00:NULL->^M"
            store_location=["/home/temp"]
                store_parameters=[param1,....,paramn]
                integrity=[integrity_id]     bit_range="all">
        </body>
</packet>
<packet id=[n] fid=[x] fsmid=[fid_n]>
    <header header_bit_specification=
        ["8R:1L:1R:2L:3R:.....:4R:4R:6L:24L:1R"]
        header_bit_total=[x]
        encoding="HEX"
        special_characters="0->00:NULL->^M"
        directional_queue=["1"]
        integrity=[integrity_id] bit_slot=""
            bit_range="all">
    </header>
    <body body_type = [4]
        body_bit_specification="250L"
        body_bit_total=[x] encoding="HEX"
        special_characters="0->00:NULL->^M"
        store_location=["/home/temp"]
    store_parameters =[param1,....,paramn]
    integrity=[integrity_id] bit_range="all">
    </body>
</packet>
<integrity id=[1] calculation=["MD5"]>
...
<integrity id=[n] calculation=["SHA"]>
```

According to another embodiment, authentication is another element to describe protocols. In many cases, testing cannot occur without proper authentication. Authentication bypass. In other situations, it cannot.

As such, the following XML was developed which defines a control structure. All calculations, other than counters, should occur within a control structure. Authentication is quite diverse across protocols and requires more research to accommodate most techniques. An exemplary code is provided below:

```
<protocol id=[x] layer=[x] name=["Protocol Name"]
directions=[1....B]
layer_below=[x1_id, x2_id, ...] >
<authenticaiton id=[x]
    host_server=["10.1.1.1"]
    aaa_user=["root"] aaa_pwd=["root"]
    <cs_action id=[n]
        start=["0"]
        action=["match=param1=param2"]
        param1=["header_bit_specification[10]"]
        param2=["MD5(aaa_pwd)"]
    end_fsm=[x] end_fid=[x]
    </cs_action>
</authentication>
...
</protocol>
```

In another embodiment, topology is another element to describe protocols. The topology of a network may be important to certain protocols. For example, many clients and servers require a centralized server to handle all correspondences. In such cases, centralized servers must be established for proper usage of out-of-the-box software. Home-grown software may be easier to reconfigure. For example, the results below show that P2P systems do not always correspond directly from peer-to-peer.

In another embodiment, system constraints are another element to describe protocols. System constraints should be considered with implementing protocols. For example, certain protocols will require higher bandwidth, faster queuing, memory and cpu time. These considerations should be considered when designing a system to support pervasive protocol testing. We can define these parameters in XML and let the system decide if it can handle the capacity.

```
<protocol id=[x] layer=[x] name=["Protocol Name"]
directions=[1....B]
layer_below=[x1_id, x2_id, ...] >
<system_constraints  id=[x] cpu=[x] dl_queue_speed=[x]
ul_queue_speed=[x]
dl_bandwidth=[x]
ul_bandwidth=[x]
</system_constraints>
---
</protocol>
```

The beauty of using XML to specify protocols is the breadth of usage. First, many different protocols can be specified, deployed and used using this technique. Second, parts of a protocol can be defined and used without defining the complete protocol. Third, reusable libraries can be established and used indefinitely without major modification.

Architecture for Protocol Testing

Another aspect of the application describes an architecture/framework for protocol testing. The architecture is shown, for example, in FIG. 1A. The architecture was designed by the inventor after much experimentation with (i) RFCs, (ii) live application clients and servers, and (iii) live network traffic. In particular, the pervasive protocol testing framework has been designed for convenience, adaptability and robustness.

Convenience is a fundamental element to the testing framework. The framework is easy and timeless enough to use so that developers and testers can learn to use it quickly and without much troubleshooting. In addition, once a protocol has been developed, the application describes that the protocol will be stored in a library for easy retrieval, reuse and versions.

Adaptability is an important element to the testing framework. The framework is durable enough to last a multi-year experiment without server re-initialization. Moreover, dynamic loading is envisaged very long run times. In addition, the architecture is robust enough to handle nearly every possible protocol without restructuring the linear bitwise representation. The architecture must also be fluid enough to support many types of application payloads. Payloads can range from static to OS customizable.

In an embodiment, the architecture can be employed with both forward and reverse transformation features as described in more detail below. Using both forward and reverse transformations broadens the usage from testing activity to cyber security protocol analysis. The analysis may include but is not limited to fuzzing, analysis done inside firewalls, and IDS systems.

Forward transformation involves taking a RFC and creating, manually by hand, the required XML format to specify the protocol. The transformation may be automated with GUIs and perhaps a RFC parser. The inventor's study showed that the forward direction is useful only in two real circumstances. First, it is useful when there are no live packet captures available. And, second, it is very useful for modifying an existing transformed protocol for the purposes of fuzzing.

Reverse transformation involves employing a transformer, such as Wireshark, that already transforms bits from the wire into a visual representation. Wireshark knows what the protocol values should be. Wireshark can identify hundreds of protocols. The selection of Wireshark to assist with the linear transformation broadens and speeds-up initial development.

Protocol Client Framework

In another embodiment, the client-side framework is able to interface with traffic at each layer. Crafting a client into separate communications at different levels [should this be layer?] has high standard deviation. Some embodiments involve where a small client only needs to be installed. Other embodiments are where further client installation needs to transpire.

From experimentation, it was determined that operation system code can either be fully modular in a best case scenario, or, it can be non-modular in a worse-case scenario. In embodiments where only the application layer is being tested, only an application layer client needs to be deployed. This is generally straight forward across operating systems. Lower levels of testing require substantial efforts. However, the payoff can be significant for testing and cyber security in both the government and industrial space.

The protocol generation system of the present application employs a graphical user interface (GUI) in the forward direction. The GUI is adapted to help developers specify or modify a protocol. A FSM can be built in the forward direction. The forward direction can also be used to verify the reverse direction findings.

In the reverse direction, the protocol generation system parses a packet capture (pcap) file. Then, it creates an internal representation. Thereafter, the protocol generation system develops a FSM finite. The FSM is built over multiple passes of the pcap file.

In an embodiment, the tool loads and deploys the protocol directly to the client or server as the protocol size. Protocol specification can require anywhere between tens to thousands of lines of XML code. Deploying the static representation dynamically requires the machines to host an opening where specifications can be loaded. This opening may be in the form of a transport layer port and can be dynamically altered and configured.

In a further embodiment, the protocol server framework may encompass both a protocol module and a payload execution module. The protocols are loaded on the server using the protocol generation system. This may be performed via a specialized port. Protocol specification can require anywhere between tens to thousands of lines of XML code. Deploying the static representation dynamically requires the machines to host an opening where specifications can be loaded. This opening may be in the form of a transport layer port and can be dynamically altered and configured.

In an embodiment, analysis of the protocol payload is described. In particular, four known scenarios for protocol execution are provided. These scenarios include: static response, XML-RPC, application that exists on the machine, and empty. The framework must be agile enough to handle the multiple payload scenarios.

Results/Experimentation/Case Studies

Plural studies were conducted for this technology. Four of the most important studies will be described in more detail below. These studies include: RFCs, Client-Servers, Chat Applications and Wireshark.

Figure 5:
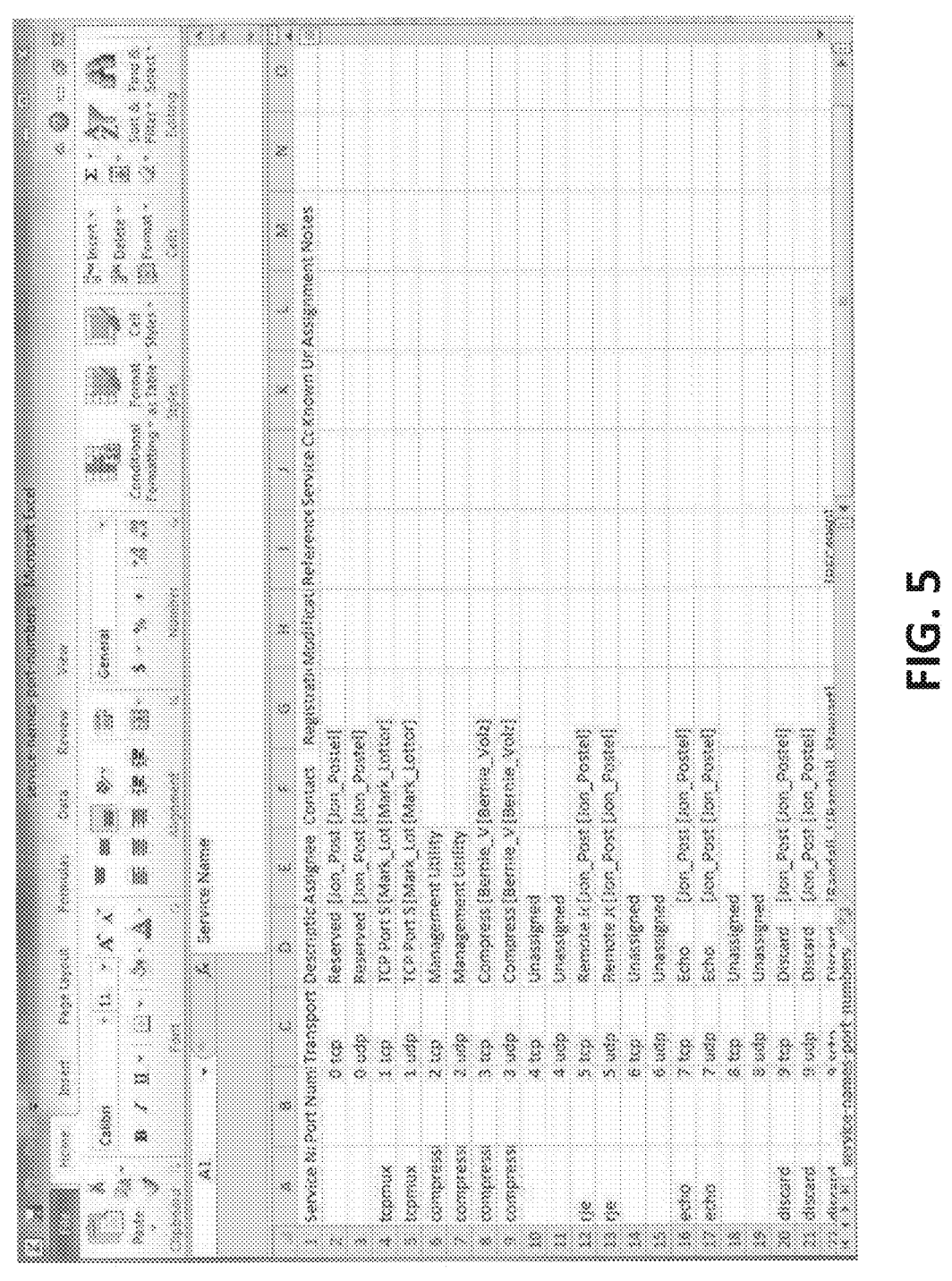
Figure 6:
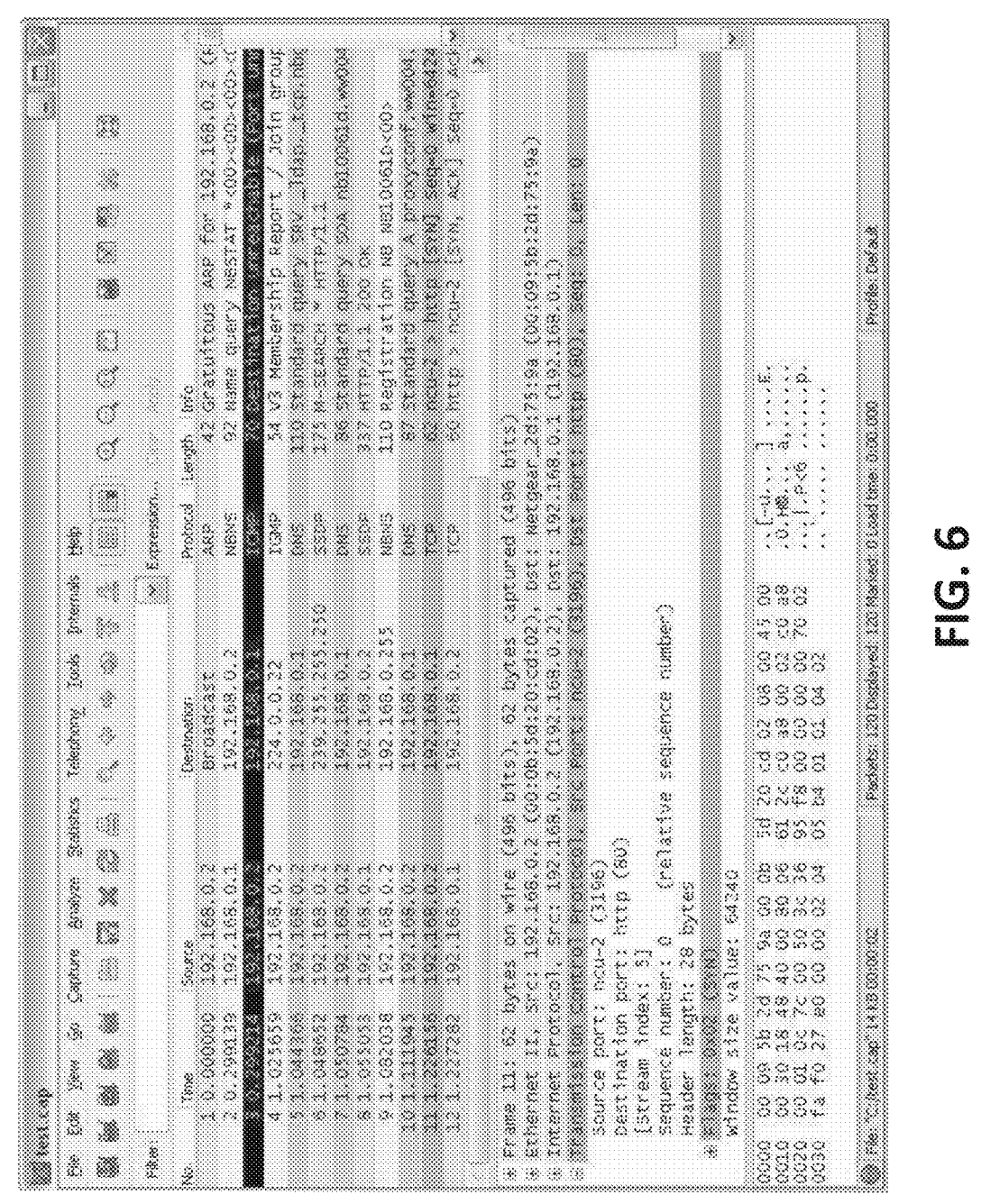

In an embodiment regarding RFCs, it was determined that having the liberty to specify each bit in a packet ensures agility. Additionally, as various OSI levels were studied, the extent of the wild protocols and rich data available was realized. For instance, via the ISO website, a list of service names to ports was found. This is illustrated in FIG. 5 with a list containing 13,636 row entries. In addition, FIG. 6 illustrates an exemplary TCP packet header and body of open source work from Wireshark from which packets can be evaluated Second, multiple clients and servers were deployed on Wireshark. These clients and servers were written in Java. Their packet captures were subsequently examined. An unexpected and interesting finding was found where user-defined legitimate application layer traffic could be sent between remote endpoints. Moreover, the traffic could all be captured via Wireshark. In an embodiment, transport layers and above could be tested employing a standard Java library.

In another embodiment, all components of the OSI stack in Java could be specified by a Java library. An exemplary open-source Java library is NetPcap. The library contains a Java wrapper for nearly all libpcap library native calls. The library encodes captured packets in real-time and provides a large library of network protocols (core protocols). Users can easily add their own protocol definitions using Java SDK and jNetPcap employing a mixture of native and Java implementation for optimum packet decoding performance.

In another embodiment, chat applications and their respective RFCs were evaluated. The first option selected was the Yahoo! instant messenger application (YMSG). For the study, two different virtual machines were set up. This is due to the application running only one client per machine. Interestingly, it was determined that chat applications, such as YMSG and GTalk, go through a centralized remote server. In other words, chat applications are not peer to peer.

Figure 7:
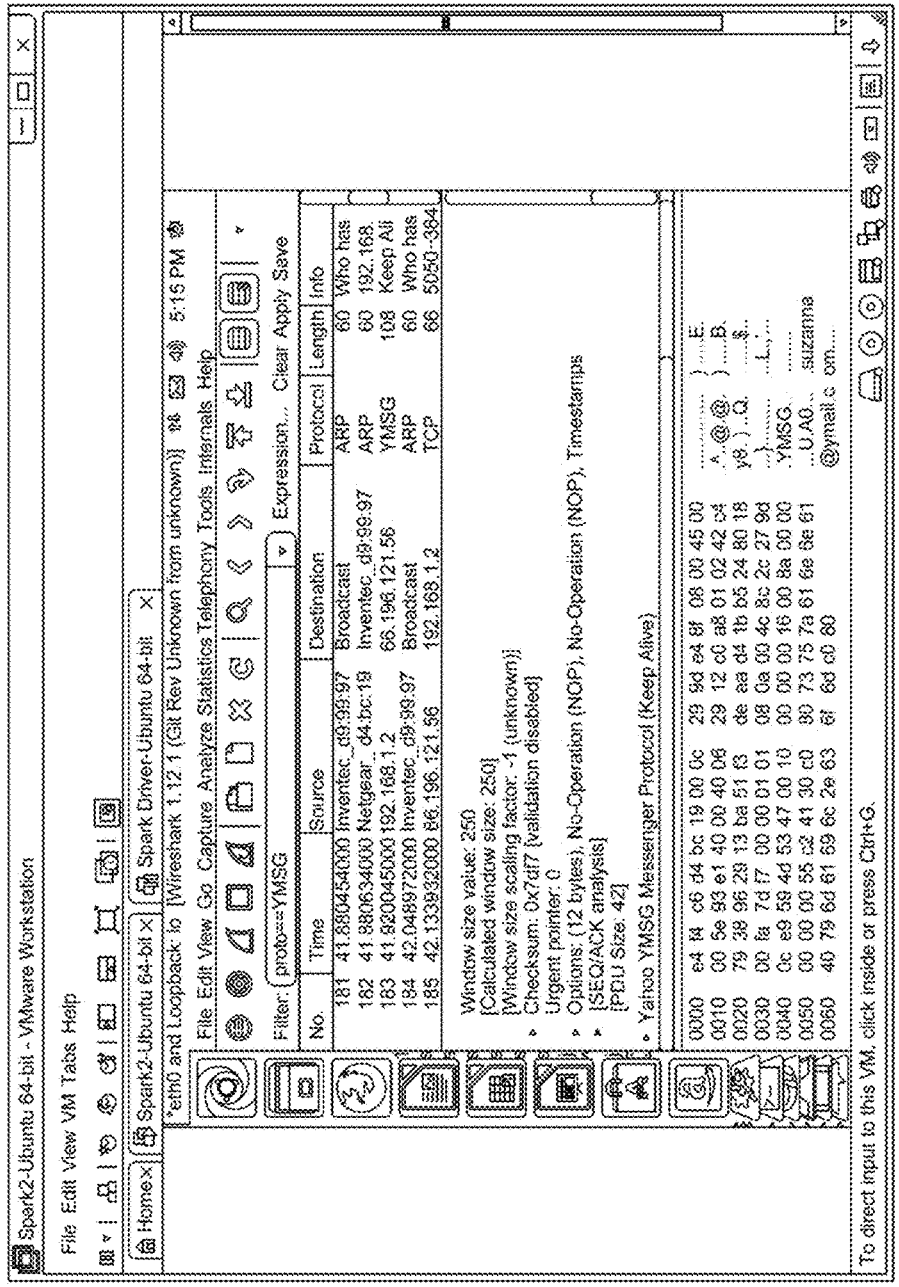
FIG. 7 illustrates an example of message traffic according to an embodiment of the application.

In this case, all local client traffic is diverted to Yahoo! servers at IP address 66.196.121.56. This is exemplary shown in FIG. 7.

The finding revealed that out-of-the-box clients from Yahoo! are not likely used for a fine grained analysis. This is due to the excessive time necessary for experimentation and set-up. In fact, it was determined that out-of-the-box YMSG chat clients will not run unless they authenticate via the Yahoo! server. Thus, using YMSG clients without setting-up up a phony authentication server is impossible without recompiling the chat code.

Further evaluation of the findings from the first Yahoo! YMSG packet captures was performed. [can you add more details about how a phony authentication server was set up? The support is necessary if we intend to rely upon the architecture/process to link the previous 2 paragraphs and the statement that follows] It was determined that yahoo traffic could be sent between any client and server of our choosing. More specifically, crafted YMSG traffic could be sent via 3rd party created servers, e.g., phony servers, and clients and the traffic could be considered authentic by a packet capture identifier such as Wireshark. In fact, Wireshark identified the YMSG traffic and provided bytes that could be employed for further modeling and send them using the established lower layers. Wireshark was again fooled into recognizing this as authentic traffic.

The YMSG Header is provided below:

Hex: 594D5347 0010 0000 004E 004B 00000016 F3536F86

Bin: 0101100101001101010100110100011100000000000010000 00000000000000000000000001001110000000000100101 10000000000000000000000000000101 10111100110101001101101111110000110

Hex Explanation:
YMSG-4-594D5347-010110010100110 10101001101000111
VER-2-0010-0000000000010000
VEND-2-0000-0000000000000000
PKLEN (78)-2-004E-0000000001001110
SERVICE-2-004B-0000000001001011
STATUS-4-00000016-0000000000010110
SESSID-4-F3536F86- 11110011010100110110111110000110

The study of the chat applications led to another significant finding. Specifically, once Wireshark distinguished traffic of a particular nature, it was determined that communication endpoints (and core) would also consider the communications authentic. Endpoints may be considered listening tools.

Figure 8:
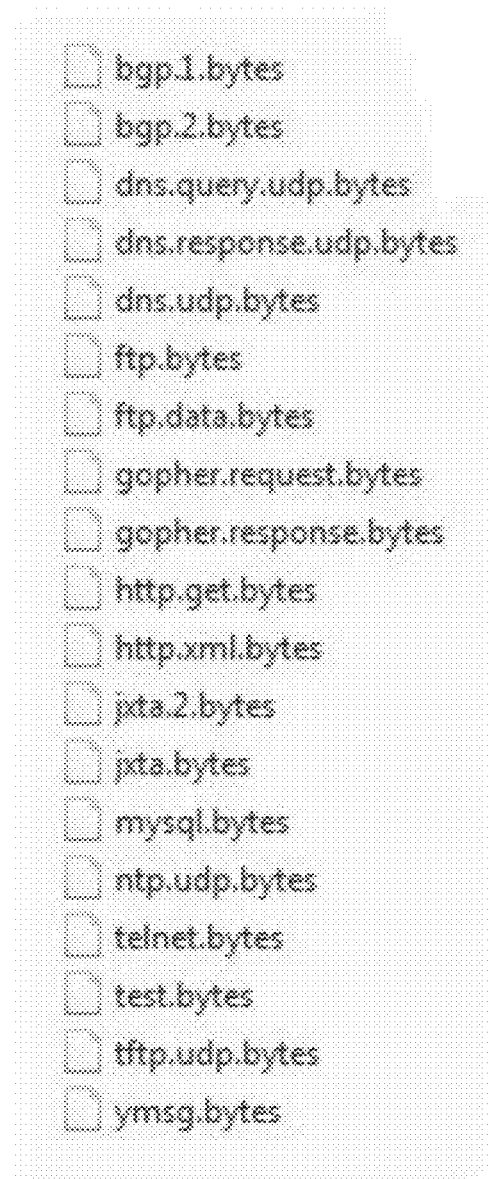
FIG. 8 illustrates an example of packet captures of application layer headers and data according to an embodiment of the application.
Figure 9:
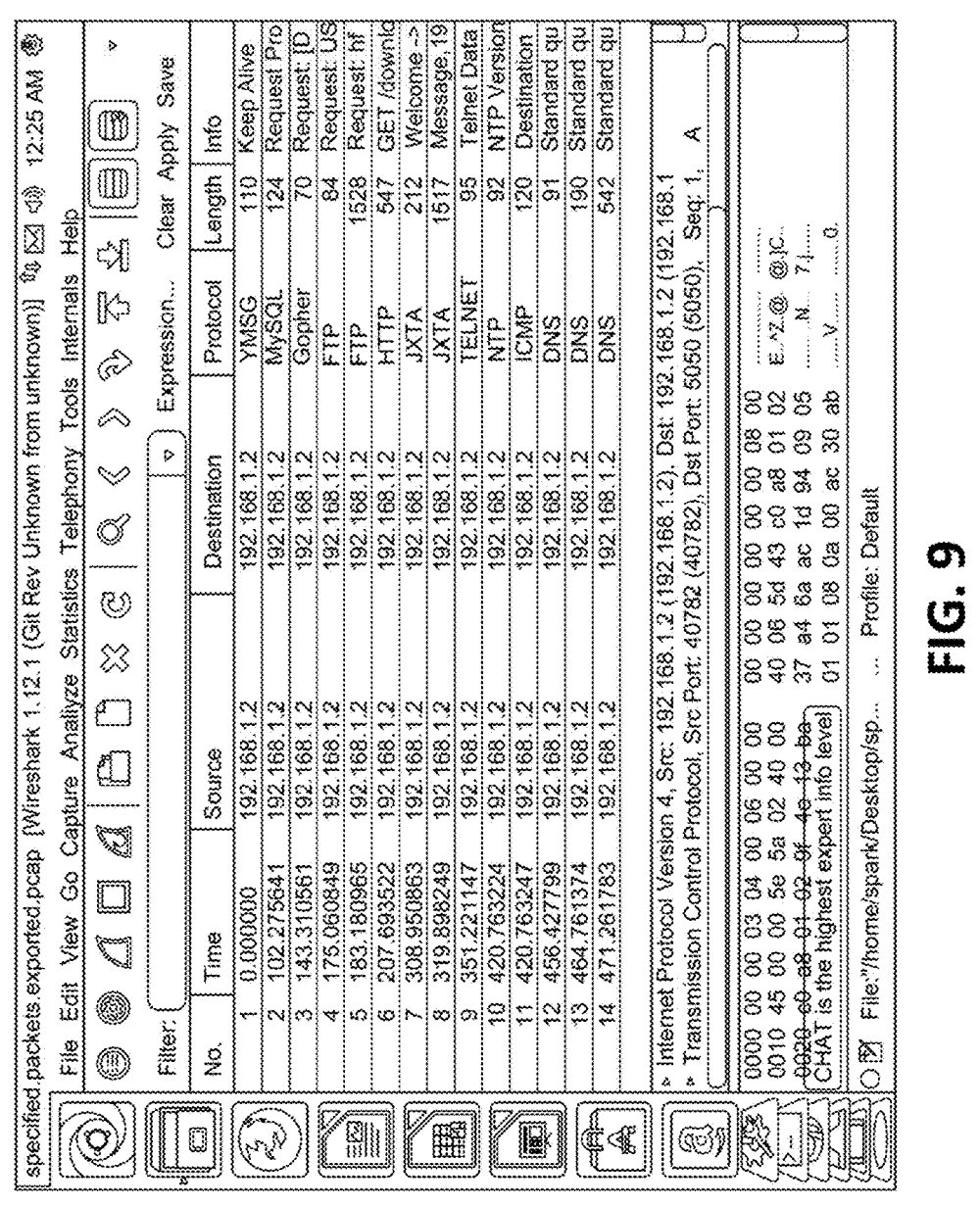

This led to further research of the pcaps from Wireshark's website as shown in the graphical user interface in FIG. 8. First, seventeen PCAPs filled with the protocol traffic were pulled. These included: Airtunes, BGP, BMP, DNS, Gopher, HTTP, InfiniBand, JXTA, Kasperky, MySQL, NNTP, NTP, SCTP, SoulSeekRoom, STP, Telnet and TFTP. The protocol headers in each capture were reviewed. Wirehark was used to pull-out specific application-layer headers and data as seen in FIG. 9.

The data was then set between a client and server selected by the third party. In this example, the client and server were both hosted at 192.168.1.2. This is exemplary shown in FIG. 9. As a result, a generic TCP and UDP client and server were hosted on the same machine and successfully used to pass a third party selected application-layer packet across the client and server. In an embodiment, packets were constructed and sent to a tcp port listening client of YMSG port 5050, BGP port 179, Gopher port 70, HTTP port 80, JXTA port 8721, MySQL port 3306, FTP port 21 and Telnet port 23. In another embodiment, UDP packets were constructed and sent from a UDP server to a UDP client for NTP port 123, DNS port 53 and TFTP on port 3445. The traffic is considered authentic as shown by its identification in FIG. 9.

According to the present application, the code below may be employed by the fitted machine to evaluate received protocols.

```
<protocol id=[x] layer=[x]
name=["Protocol Name"]
    directions=[1....B]
    layer_below=[x1_id, x2_id, ..., xn_id] >
<system_constraints id=[x]
    cpu=[x]
    dl_queue_speed=[x]
    ul_queue_speed=[x]
    dl_bandwidth=[x]
    ul_bandwidth=[x]
    </system_constraints>
<authentication id=[x]
        host_server=["10.1.1.1"]
        aaa_user=["root"]
        aaa_pwd=["root"]
        <cs_action id=[n]
            start=["0"]
            action=["match=param1=param2"]
            param1=["header_bit_specification[10]"]
            param2=["MD5(aaa_pwd)"]
            end_fsm=[x] end_fid=[x]
            </cs_action>
</authentication>
<integrity id=[1] calculation=["MD5"]>
...
<integrity id=[n] calculation=["SHA"]>
<fsm id=[x] nodes=[x] edges=[x]>
    <fid=[x] node id=[x] edge=[node_id]
        counter=[counter_id1, ..., counter_idn]
        failure=[failure_id1, ..., failure_idn]
        control_structure[cs_id1, ..., cs_idn]>
    <fid=[x] node id=[x1] edge=[node_id]
        counter=[counter_id1, ..., counter_idn]
        failure=[failure_id1, ..., failure_idn]
        control_structure[cs_id1, ..., cs_idn]>
    ....
    <fid=[x] node id=[n] edge=[node_id]
        counter=[counter_id1, ..., counter_idn]
        failure=[failure_id1, ..., failure_idn]
        control_structure[cs_id1, ..., cs_idn]>
</fsm>
<queue id=[x] default_queue_id=["0 or 1"]
        cs_ids=[1,...,n]>
    </queue>
...
<queue id=[xn] default_queue_id=["0 or 1"] cs_ids=[1,...,n]>
</queue>
<timer id=[x] fsm=[x] fid=[x]
        start=["arrival"]
        end=["30s"]
        action=["fid"]
        param1=["header_bit_specification[1]"]
        </timer>
...
<timer id=[x] fsm=[x] fid=[x]
        start=["departure"]
        end=["30s"]
        action=["fid"]
        </timer>
<counter id=[x] fsm=[x] fid=[x]
        start=["0"] action=["param1+param1"]
        param1=["header_bit_specification[1]"]
        </counter>
...
<counter_id=[x] fsm=[x] fid=[x]
        start=["header_bit_specification[10]"]
        action=["++"]
        </counter>
<control_structures id=[x] fsm=[x] fid=[x] >
        <cs_action id=[x]
```

-continued

```
            start=["0"] action=["+=param1"]
            param1=["header_bit_specification[10]"]
            end_fsm=[x] end_fid=[x]
            </cs_action>
...
<cs_action id=[n] start=["0"]
        action=["+=param1"]
        param1=["header_bit_specification[10]"]
        end_fsm=[x] end_fid=[x]
        </cs_action>
        </control_structure>
...
<control_structures id=[n] fsm=[x] fid=[x] >
    <cs_action id=[x]
        start=["0"]
        action=["+=param1"]
        param1=["header_bit_specification[10]"]
        end_fsm=[x] end_fid=[x]
</cs_action>
...
    <cs_action id=[n]start=["0"]
        action=["+=param1"]
        param1=["header_bit_specification[10]"]
        end_fsm=[x] end_fid=[x]
        </cs_action>
</control_structure>
<packet id=[x] fid=[x] fsmid=[fid]>
<header header_bit_specification=
        ["8R:1L:1R:2L:3R:....:4R:4R:6L:24L:1R"]
        header_bit_total=[x] encoding="HEX"
        special_characters="0->00:NULL->^M" >
        directional_queue=["0"]
        integrity=[integrity_id]     bit_slot="5"
        bit_range="">
</header>
<body body_type = [1]
        body_bit_specification="1R:8R:9R:....:150L"
        body_bit_total=[x] encoding="HEX"
        special_characters="0->00:NULL->^M"
        body_bit_content=["YMSG":"\r":....:"STATIC"]>
        integrity=[integrity_id]     bit_range="all">
    </body>
</packet>
<packet id=[x] fid=[x] fsmid=[fid] >
<header header_bit_specification=
        ["8R:1L:1R:2L:3R:....:4R:4R:6L:24L:1R"]
        header_bit_total=[x]
        encoding="HEX"
        special_characters="0->00:NULL->^M" >
</header>
<body body_type = [2]
        body_bit_specification="1R:8R:9R:....:150L"
        body_bit_total=[x]
        encoding="HEX"
        special_characters="0->00:NULL->^M"
        rpc_library_location=["/home/rpc_library"]
        body_bit_content =["rpc_method_call"]>
</body>
</packet>
...
<packet id=[n-1] fid=[x] fsmid=[fid_n]>
<header header_bit_specification=
["8R:1L:1R:2L:3R:....:4R:4R:6L:24L:1R"]
        header_bit_total=[x]
        encoding="HEX"
        special_characters="0->00:NULL->^M"  >
</header>
<body body_type = [3]
body_bit_specification="1R:8R:9R:....:150L" body_bit_total=[x]
        encoding="HEX"
        special_characters="0->00:NULL->^M"
        application_location=["/sbin/applicaiton"]
        application_parameters  =[param1,....,paramn]>
</body>
</packet>
<packet id=[n] fid=[x] fsmid=[fid_n]>
<header header_bit_specification=
        ["8R:1L:1R:2L:3R:....:4R:4R:6L:24L:1R"]
        header_bit_total=[x]
```

-continued

```
            encoding="HEX"
            special_characters="0->00:NULL->^M"  >
        </header>
      <body body_type = [4]
            body_bit_specification="250L" body_bit_total=[x]
            encoding="HEX"
            special_characters="0->00:NULL->^M"
            store_location=["/home/temp"]
            store_parameters =[param1,....,paramn]>
      </body>
    </packet>
  ...
  </protocol>
```

Based on the research and findings of this application, the three diverse domains of testing, security and authentication of traffic analysis are linked. In particular, this is performed by the described mathematical bitwise linear transformation of a protocol. It is envisaged that tens-of-thousands of protocols will ultimately be impacted by this research. As a result, a single pervasive protocol analysis framework can be employed in practice to capture requirements from these three overlapping domains.

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A computer-implemented method for generating a linear representation of a protocol on a network comprising the steps of:
   receiving, via a packet analyzer, a packet capture file or specification from the network;
   selecting the protocol from the packet capture file or specification based upon predetermined criteria;
   sending the selected protocol to a protocol generator that parses information of the protocol for characterization;
   outputting the linear representation of the protocol based upon the parsed information;
   spawning a finite state machine (FSM) including the linear representation of the protocol;
   sending the FSM having a state transition to a network node; and
   dynamically altering the state transition and modifying the linear representation of the protocol without rebooting the network node,
   wherein a state transition of the FSM changes one or more of a message header, timer and payload.

2. The method according to claim 1, wherein the linear representation is output onto a graphical user interface or a file.

3. The method according to claim 1, wherein the information includes one or more of direction, stack layer, header format, alignment, encoding attributes, special characters, finite state machine identifiers for nodes and edges, finite state machine message header values, finite state machine timer values, finite state machine payload values, state of the finite state machine, control structures, counters, time intervals, integrity, system and constraints.

4. The method according to claim 3, wherein the state of the FSM is selected from the group consisting of static, ability to be further parsed or retrieved, association with an application on the FSM, and empty content.

5. The method according to claim 1, wherein the protocol generator is located on a virtual machine.

6. The method according to claim 1, wherein the linear representation of the protocol is independent of an application on the FSM.

7. The method according to claim 1, further comprising: sending the finite state machine to the network node.

* * * * *